US012100105B2

(12) United States Patent
Assarsson et al.

(10) Patent No.: US 12,100,105 B2
(45) Date of Patent: Sep. 24, 2024

(54) METHOD FOR PERFORMING VOLUMETRIC RECONSTRUCTION

(71) Applicant: Dimension Stream Labs AB, Gothenburg (SE)

(72) Inventors: Ulf Assarsson, Gothenburg (SE); Erik Sintorn, Gothenburg (SE); Sverker Rasmuson, Mölndal (SE)

(73) Assignee: DIMENSION STREAM LABS AB, Gothenburg (SE)

( * ) Notice: Subject to any disclaimer, the term of this patent is extended or adjusted under 35 U.S.C. 154(b) by 93 days.

(21) Appl. No.: 17/992,144

(22) Filed: Nov. 22, 2022

(65) Prior Publication Data

US 2023/0177771 A1 Jun. 8, 2023

(30) Foreign Application Priority Data

Dec. 2, 2021 (EP) .................................... 21212007

(51) Int. Cl.
*G06T 17/10* (2006.01)
*G06F 3/01* (2006.01)
(Continued)

(52) U.S. Cl.
CPC .............. *G06T 17/10* (2013.01); *G06F 3/012* (2013.01); *G06T 7/70* (2017.01); *G06T 15/06* (2013.01);
(Continued)

(58) Field of Classification Search
CPC ........... G06T 17/10; G06T 15/20; G06T 7/70; G06T 15/06; G06T 15/08; G06T 17/20;
(Continued)

(56) References Cited

U.S. PATENT DOCUMENTS

| 2011/0063288 A1* | 3/2011 | Valadez | .................. G06T 19/20 345/419 |
| 2020/0351736 A1* | 11/2020 | Sun | ........................ H04W 36/00 |

(Continued)

OTHER PUBLICATIONS

"NeRF: Representing Scenes as Neural Radiance Fields for View Synthesis", by B. Mildenhall, UC Berkeley, arXiv:2003.08934v2, Aug. 3, 2020, 25 pages.

(Continued)

*Primary Examiner* — Phi Hoang
(74) *Attorney, Agent, or Firm* — Westman, Champlin & Koehler, P.A.

(57) ABSTRACT

The present disclosure relates to a method and capturing arrangement for creating a three-dimensional model of a scene. The model comprises a three-dimensional space comprising a plurality of discrete three-dimensional volume elements ($V_{1,1}$, $V_{1,2}$) associated with three initial direction-independent color values and an initial opacity value. The method comprises obtaining a plurality of images of said scene and defining a minimization problem. Wherein the minimization problem comprises three residuals, one for each color value, wherein each residual is based on the difference between (a) the color value of each image element of each image and (b) an accumulated direction-independent color value of the volume along each ray path of each image element. The method further comprises creating the three-dimensional model of the scene by solving said minimization problem.

14 Claims, 9 Drawing Sheets

(51) Int. Cl.
  *G06T 7/70* (2017.01)
  *G06T 15/06* (2011.01)
  *G06T 15/08* (2011.01)
  *G06T 15/20* (2011.01)
  *G06T 17/20* (2006.01)

(52) U.S. Cl.
  CPC .............. *G06T 15/08* (2013.01); *G06T 15/20* (2013.01); *G06T 17/20* (2013.01); *G06T 2200/08* (2013.01); *G06T 2207/30196* (2013.01); *G06T 2210/62* (2013.01); *G06T 2215/12* (2013.01)

(58) Field of Classification Search
  CPC ....... G06T 2210/62; G06T 2207/30196; G06T 2200/08; G06T 7/55; G06T 2215/12; G06T 17/00; G06F 3/012
  See application file for complete search history.

(56) References Cited

U.S. PATENT DOCUMENTS

| 2020/0357136 | A1* | 11/2020 | Qiao | G06T 7/248 |
| 2021/0082180 | A1* | 3/2021 | Fedyukov | G06T 7/50 |
| 2021/0279943 | A1* | 9/2021 | Murez | G06T 17/00 |

OTHER PUBLICATIONS

Extended European Search Report from European Patent Application No. 21212007.5, dated Sep. 2, 2022.

"Improved Voxel Coloring Via Volumetric Optimization", by Gregory G Slabaugh et al., School of Electrical and Computer Engineering Georgia Institute of Technology, Dec. 31, 2000, XP055193480, 17 pages.

"Incremental Voxel Colouring by Ray Traversal", by Batchelor O et al., University of Canterbury Dept. Computer Science & Software Engineering, Jul. 26, 2006, XP010934355, 6 pages.

"Reconstruction of Volumetric 3D Models", by Peter Eisert, Fraunhofer Institute for Telecommunications, Berlin, Germany, Jul. 28, 2005, XP055921388, 20 pages.

"Towards Real-Time Voxel Coloring", by Andrew Prock et al., Department of Computer Science, University of Wisconsin, Jan. 1, 1998, XP055921933, 7 pages.

"A Surface Evolution Approach of Probabilistic Space Carving", by Yezzi A et al., School of Electrical and Computer Engineering, Georgia Institute of Technology, Jun. 19, 2002, XP010596717, 4 pages.

"A Probabilistic Framework for Space Carving", by Broadhurst A et al., Department of Engineering, University of Cambridge, Jul. 7, 2001, XP010554008, 6 pages.

* cited by examiner

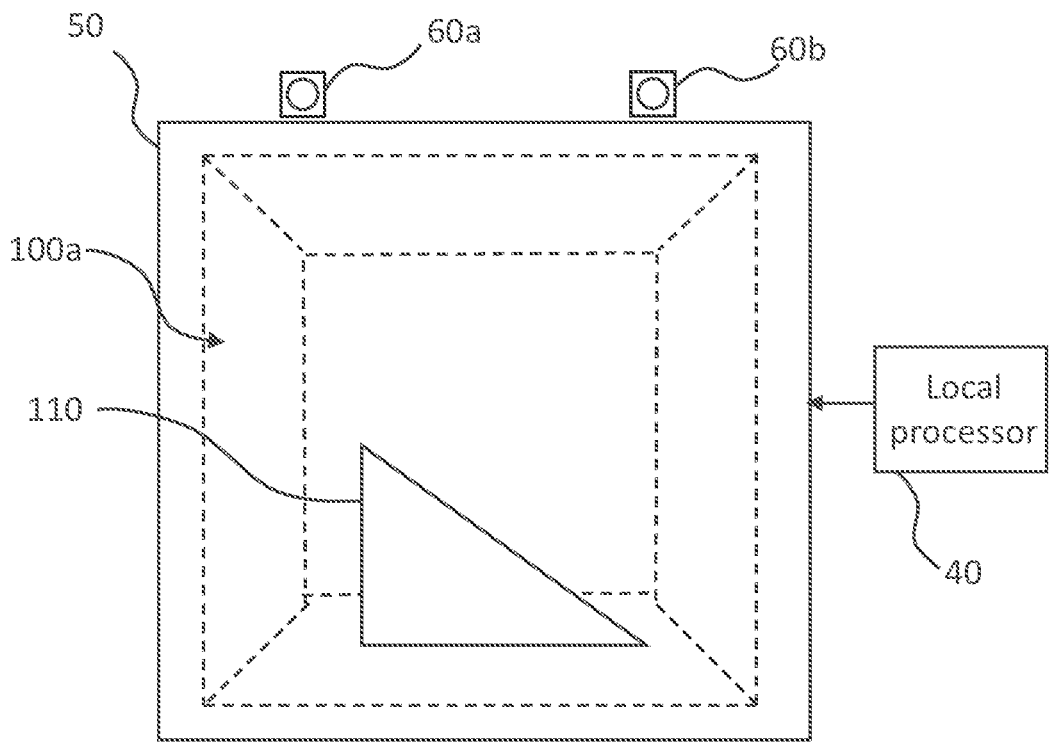
*Fig. 7a*
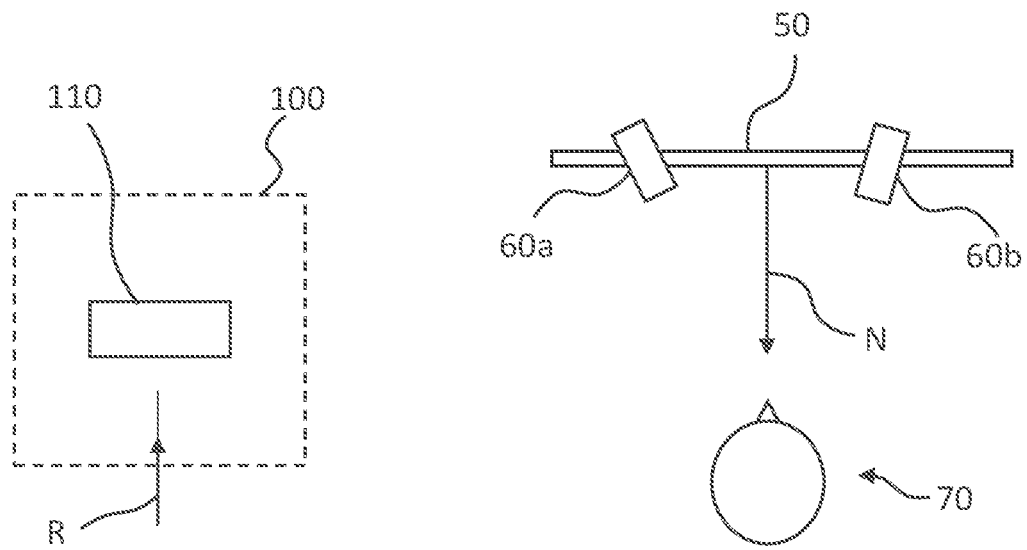
*Fig. 7b*  *Fig. 7c*

METHOD FOR PERFORMING VOLUMETRIC RECONSTRUCTION

CROSS-REFERENCE TO RELATED APPLICATION

This application claims priority to European Patent Application No. 21212007.5 filed Dec. 2, 2021, the content of which is hereby incorporated by reference in its entirety.

TECHNICAL FIELD OF THE INVENTION

The present invention relates to a method for performing three-dimensional reconstruction from a plurality of images and a capturing arrangement performing the said method to create a three-dimensional model of the scene.

BACKGROUND OF THE INVENTION

There are alternative approaches for performing 3D reconstruction of a scene using one or several 2D images of the scene. For instance, the depth of a scene can be obtained by employing depth-from-focus methods, depth-from-motion methods, stereo image processing or training a neural network to interpret depth from the image(s). Available solutions for 3D reconstruction from 2D data allows for the capture of 3D models and recording volumetric video. However, all existing 3D-reconstruction methods suffer from limitations, e.g., scene conditions, recording conditions, and the tradeoff between accuracy and computational speed. The most general methods that provide high-quality results are too computationally intensive to allow use in real-time implementations with high-resolution.

For instance, by using two or more cameras (such as a stereo-camera system) to acquire two or more images of a same object from known viewing positions, a 3D model of the object may be constructed by performing a mapping of pixels or features of the images to a 3D space. However, while 3D reconstruction using pixel or feature mapping of camera images often can provide quite accurate results for objects without view dependent properties and with distinct surface features, the method may have difficulties to capture objects exhibiting a view dependence (such as objects featuring glossy surfaces that cause reflection) or objects not having clearly distinguishable surface features (e.g., a uniformly colored surface).

Recently, important advances have been made in the application of Deep Neural Networks (DNNs) to perform 3D reconstruction. Special neural models, referred to as Neural Radiance Fields (NeRFs), has proven to be a powerful tool in 3D reconstruction due to the NeRFs providing high quality reconstruction for a wide range of captured scenes. NeRFs are capable of reconstructing volumetric materials (such as gas or fire), thin details such as hair or laces, and even complicated view dependent effects such as refraction through transparent surfaces and reflections. As 3D reconstruction from 2D images is an inherently ill-posed problem due to the exitance of many plausible solutions it is not surprising that neural networks—trained to penalize less likely solutions—have proven to be a fruitful approach.

In for instance Mildenhall et al., 'NeRF: Representing Scenes as Neural Radiance Fields for View Synthesis', 2020 ECCV there is proposed a neural network which has been trained with in the order of one hundred unique 2D images of a scene to output a direction-dependent RGB color value and an opacity value given a 3D-coordinate and view direction in the scene as input. Accordingly, the NeRF of Mildenhall et al. represents a 5D function which defines an opacity value and a direction-dependent color value for each point in the 3D scene which enables high quality 3D reconstruction. After the NeRF has been trained with 2D images of a scene the scene can be rendered from novel points of view by querying the trained NeRF with sets of 3D-coordinates and view directions and employing conventional raymarching rendering techniques through the scene.

A drawback of the NeRF is that the training process is highly computationally intensive and difficult to parallelize efficiently and therefore the associated training time could be hours or days, to allow the neural network to establish an accurate 5D function which captures the view dependent 3D scene, even when the training is performed on multiple high performance Graphics Processing Units (GPUs) or Tensor Processing Units (TPUs). Despite many attempts to speed up the process there has only been miniscule improvements to the capturing of a 3D scene (i.e. the training of the NeRF) whereas many solutions have been suggested relating to speeding up the rendering (i.e. the use of an already trained NeRF) to create novel views of a captured 3D scene.

High-quality reconstruction methods such as the NeRF-based approaches are therefore still unsuitable for applications requiring real time reconstruction.

SUMMARY OF THE INVENTION

In view of the drawbacks of existing solutions for performing 3D reconstruction from 2D images discussed in the above there is a need for an improved method of performing 3D reconstruction from 2D images more efficiently. It is therefore a purpose of the present invention to provide such an improved method and a capturing arrangement for creating a three-dimensional model employing this improved method.

According to a first aspect of the invention there is provided a method for creating a three-dimensional model of a scene. The model comprising a three-dimensional space comprising a plurality of discrete three-dimensional volume elements wherein each three-dimensional volume element is associated with three initial direction-independent color values and an initial opacity value. The method comprising obtaining a plurality of images of the scene wherein each image comprises a grid of image elements and each image element is associated with three color values and a ray path through the three-dimensional space. The method further comprising defining a minimization problem, wherein the direction-independent color values and opacity value of each volume element forms the parameters of the minimization problem and the minimization problem comprises three residuals, one for each color value. Each residual is in turn based on the difference between (a) the color value of each image element of each image and (b) an accumulated direction-independent color value, obtained by accumulating the direction-independent color value and opacity value of each volume element along the ray path of each image element of each image. The method further comprises creating the three-dimensional model of the scene by solving the minimization problem by adjusting the parameters so as to reduce each residual below a predetermined threshold with an iterative solver.

With a "discrete three-dimensional volume element" it is meant any representation of a volume element. For instance, the volume elements may be defined as voxels or three-dimensional shapes (such as cubes) which span a three-dimensional volume in the three-dimensional space and are associated with three-color values and one opacity value.

By "solving the minimization problem" it is meant adjusting (e.g. using an iterative solver) the parameters until the residuals are below a predetermined convergence threshold. For instance, the convergence threshold may be for the sum of the residuals, or a separate convergence threshold may be set for a sum of each type (e.g. color type) of residual.

The invention is at least partially based on the understanding that by formulating a minimization problem with the direction-independent color values and opacity values of the three-dimensional volume elements as parameters an accurate three-dimensional model of the scene may be obtained using comparatively few iterations wherein each iteration is suitable for parallelization. The inventors have realized that the three color values of each image element is sufficient for the solver to converge for a general scene captured by the images. Moreover, as the present method operates directly on an explicitly expressed three-dimensional space defined by the parameters the model is accessible at any stage of the solving procedure (reconstruction) and using efficient solvers the present method arrives much more rapidly at a three-dimensional model which is as accurate as those generated with computationally cumbersome neural networks. For comparison, a NeRF may require more than 100000 serial iterations during training to capture a scene wherein the processing in each serial iteration is ill suited for parallelization. Experiments with the method of the present invention has shown that convergence for a predetermined resolution may be reached after approximately 30 iterations wherein each iteration is much better suited for parallelization.

The minimization problem may be defined as a nonlinear least squares problem. The iterative solver may then be an iterative Gauss-Newton solver. As solving a non-linear least squares problem with a Gauss-Newton solver may be performed efficiently using parallel solvers the method of the present invention is capable of arriving at an accurate three-dimensional model in a faster and/or more efficient manner in comparison to the prior art.

Defining the minimization problem as a non-linear least squares problem is merely exemplary and the minimization problem may be defined on alternative forms such as any suitable non-linear problem or energy minimization problem. Similarly, the invention may be carried out with other solvers than the Gauss-Newton solver, such as with a Levenberg-Marquardt solver, a Newton solver, a Davidson-Fletcher-Powell solver, or a Gradient Descent solver.

In some implementations, solving the minimization problem comprises calculating each residual in parallel and solving the minimization with an iterative parallel solver.

Accordingly, even as the number of residuals increases for higher resolutions the residuals may be calculated efficiently in parallel. Also, a parallel iterative solver may be employed to solve the minimization problem.

In some implementations, solving the minimization problem by adjusting the parameters comprises solving the minimization problem for a first resolution of the three-dimensional space and for a second resolution of the three-dimensional space, wherein the second resolution is higher compared to the first resolution.

Accordingly, the minimization problem may be solved hierarchically for different resolutions of the three-dimensional space which facilitates convergence. The minimization problem may be solved for two, three, four, five or more resolutions. As the resolution of the three-dimensional space containing the three-dimensional model under reconstruction is increased the resolution of the image elements and optional environment maps may also be increased accordingly. In some implementations, the initialization of the color and opacity values of a higher resolution representation of the three-dimensional space is based on the solution arrived at for a lower resolution representation of the three-dimensional space. For instance, the minimization problem is solved at the first resolution to obtain a first resolution model of the scene prior to solving the minimization problem at the second resolution. Wherein the method further comprises initializing each volume element of the three-dimensional space at the second resolution with three initial direction-independent color values and an initial opacity value based on the three direction-independent color values and an opacity value of each volume element of the first resolution model of the scene.

That is, by referring to the parameters arrived at by the solver for the first resolution the initialization parameters for the second resolution may be determined. For instance, the initialization parameters for the second resolution may be determined by interpolating the parameters arrived at by the iterative solver for the first resolution. Similarly, at least the parameters obtained by solving the minimization problem at the second resolution may be used to initialize a third resolution representation of the three-dimensional space and at least the parameters of the third resolution obtained by solving the minimization problem at the third resolution may be used to initialize a fourth resolution representation of the three-dimensional space and so forth, wherein the fourth resolution is higher than the third resolution which in turn is higher than the second resolution.

By solving the minimization problem hierarchically the robustness of the method is enhanced as the iterative solver is less likely to converge to a local minimum. Moreover, for each resolution that is higher than the first resolution an approximate low-resolution representation of the three-dimensional model is used as initialization which facilitates convergence with fewer iterations. Experiments with four resolutions have shown that approximately 130 serial iterations (divided approximately equally between the resolutions) is sufficient to create a three-dimensional model on par with models created by querying a NeRF which has been trained using 100000 to 500000 serial iterations. Additionally, as the computational cost of performing each iteration of the method of the present invention increases with the resolution the iterations for the lower resolutions may be performed more rapidly.

In some implementations, the method further comprises first selecting at least two images of the plurality of images wherein each of the at least two images comprise an image element with a ray path passing through a same volume element of the created model and then determining for each color value of the same volume element in the created model a spherical function indicative of the direction-dependent color intensity of the volume element. Wherein the spherical function is based on the corresponding color value of the image element with a ray path passing through the same volume element of the obtained model.

As the solution arrived at by the iterative solver comprises direction-independent color values an enhanced three-dimensional model with direction-dependent color values may be created using the three-dimensional model arrived at by the solver. By neglecting the direction dependence in the three-dimensional model the rate of convergence increases and the complexity of the calculations in each iteration is simplified whereafter the direction-dependence may be added as a post-processing step at a comparatively low computational cost.

The spherical functions may be spherical harmonic functions or spherical gaussian functions indicating the direction color dependence of each color of each or at least a set of the three-dimensional volume elements. For instance, each volume element may be associated with three spherical functions, one for each color value.

Spherical functions of a particular volume element may be determined based on the actual color values of at least two image elements, each having an associated ray path through the particular volume element. If there is a difference between the color value of a first image element along a first ray path and a second image element along a second ray path the difference in color and the direction of the associated ray paths may be utilized to determine spherical functions for the volume element such that the color values of each image element are at least approximately satisfied simultaneously. Thus, the enhanced three-dimensional model may capture direction-dependent color values to better represent the actual scene.

In some implementations, by comparing the image elements of the images with the accumulated color values along each ray path for the created three-dimensional model a difference may be determined for each image element. Image elements with a difference above a predetermined threshold value may be established to be associated with a view-dependent volume element via the associated ray path. For instance, the spherical functions may be assigned to volume elements encountered along ray paths associated with image elements having a difference above the predetermined threshold value In some implementations, the method further comprises defining an auxiliary element for each image element of each image wherein the auxiliary element is associated with a weighting value and the three color values (i.e. a copy) of the associated image element. Wherein each residual for each color is based on the difference between (a) the color value of each image element of each image and (b) a modified accumulated direction-independent color value and wherein the modified accumulated direction-independent color value is based on a weighted sum of the accumulated direction-independent color value and the color value of the auxiliary element. Where the weights of the weighted sum are based on the weighting parameter and wherein the weighting parameter of each auxiliary element is a parameter of the minimization problem.

Accordingly, each image is associated with an auxiliary image plane comprising auxiliary image elements corresponding to the image elements of the image. Thus, each auxiliary image plane acts as an individual environment map (or filter) for each image with the purpose of capturing any view dependent color values in the scene. The weights of the weighted sum may be defined as 1— A for the accumulated direction-independent color value and A for the color value of the auxiliary element for the weighting parameter A ranging from 0 to 1. Thus, the solver is provided with the opportunity to introduce a copy of the color of each image element in front of each image element as an auxiliary element wherein the transparency of the auxiliary element is defined by the weighting parameter. Thus, for image elements that e.g. sees a white reflection coming from a volume element that the other image(s) perceive as blue the solver may introduce the white color auxiliary element in front of the image element.

In some implementations, a penalty residual is added for each auxiliary element based on the weighting parameter such that auxiliary elements which introduce more of the image element color are penalized more so as to avoid a solver converging to trivial solutions that ignore the three-dimensional volume and only assign perfect auxiliary image planes.

Additionally or alternatively, the color values of the auxiliary elements may not necessarily be copies of the associated image element and may be assigned arbitrarily by the solver and included as a parameters in the minimization problem.

In some implementations, the opacity value ranges from a first value, indicating a fully transparent volume element, and a second value, indicating a fully opaque volume element. Wherein the minimization problem comprises an opacity residual for each image element based on the accumulated opacity along the ray path of each image element and wherein the opacity residual is proportional to the smallest one of (a) the difference between the accumulated opacity and the first value and (b) the difference between the accumulated opacity and the second value.

Thus, the opacity residual will encourage the iterative solver to find solutions wherein each volume element is either fully opaque or fully transparent. Accordingly, smoke-like artifacts which the solver may create to capture view-dependent properties may be eliminated. In some implementations, the opacity residual is weighted with a weighting factor $\lambda$ which adjusts the priority of the opacity residual with respect to the other residuals. For instance, a first lower value of lambda is used when solving the minimization problem and a second higher $\lambda$ is assigned for a one or more subsequent iterations that are performed for the created three-dimensional model to further suppress any remaining smoke-like artifacts.

In some implementations, the method further comprises defining a two-dimensional environment map at least partially surrounding the three-dimensional volume elements. The environment map comprises a plurality of two-dimensional environment map elements wherein each environment map element comprises three color values and an opacity value and are initialized with three initial direction-independent color values and an initial opacity value. Moreover, the parameters of the minimization problem further comprises the direction-independent color values and opacity value of the environment map.

With a two-dimensional environment map the three-dimensional space describing the created model is accompanied with at least one two-dimensional environment maps arranged at least partially around the three-dimensional model and describing the background of the three-dimensional model (and the background of the scene). While the parameters of the three-dimensional environment maps may be expressed as entries in a two-dimensional data structure the environment maps may be curved in a three-dimensional space surrounding the three-dimensional volume formed by the three-dimensional volume elements. For instance, the environment map(s) may be spheres, portions of spheres, or cube surfaces that at least partially surround the three-dimensional model. Additionally, more than one environment map may be provided at least partially surrounding the three-dimensional model. For instance, two or more environment maps may be arranged in two or more stacked layers at least partially surrounding the three-dimensional model, wherein one environment is placed between the other environment map and the three-dimensional model. Accordingly, the created three-dimensional model may be rendered from an arbitrary point of view with an accurate background described by the at least one environment map.

According to a second aspect of the invention there is provided a capture arrangement for capturing a three-dimensional model of a scene. The model comprises a three-dimensional space which in turn comprises a plurality of discrete three-dimensional volume elements, each three-dimensional volume element being associated with three initial direction-independent color values and an initial opacity value. The system comprises a plurality of cameras configured to capture a plurality of images of the scene, each image comprising a grid of image elements wherein each image element is associated with three color values and a ray path through the three-dimensional space. The system further comprises a processing device configured to create the three-dimensional model of the scene by solving a minimization problem with three residuals, one for each color value, using a solver for adjusting a set of parameters of the minimization problem so as to reduce each residual below a predetermined convergence threshold level. The parameters of the minimization problem comprise the direction-independent color values and opacity value of each volume element and wherein each residual is based on the difference between (a) the color value of each image element of each image and (b) an accumulated direction-independent color value, obtained by accumulating the direction-independent color value and opacity value of each volume element along the ray path of each image element of each image.

Accordingly, the capture arrangement may be configured to perform the method of the first aspect of the invention and create a three-dimensional model of the scene.

In some implementations, the capturing arrangement described in the above is provided as a part of a capturing and rendering system further comprising a rendering arrangement. Wherein the rendering arrangement comprises a display, configured to display an image, and head position determining means, configured to determine the head position of a user relative a normal of the display. The rendering arrangement further comprises a rendering unit configured to obtain the three-dimensional model captured by the capturing device, a reference direction indicating a reference view direction of the model, and the head position of the user determined by the head position determining means and wherein the rendering unit is further configured to render an image of the three-dimensional model from a target view direction and provide the image to the display. Wherein the displacement of the target view direction from the reference view direction is equal to the displacement of the head position of the user relative the normal of the display.

Accordingly, by capturing and rendering a three-dimensional model the capturing and rendering system may render the three-dimensional from a view direction which depends on the direction from which the user observers the display. The rendering system may thereby provide a convincing window effect (which is described in more detail in the below) wherein the display may act as a fixed window into the captured three-dimensional model. Further, the rendering system may employ any conventional rendering technique suitable for rendering the three-dimensional model such as ray marching through the model.

In some implementations, the system updates the three-dimensional model and the target view direction periodically to capture and render three-dimensional video as a part of a videoconferencing system.

By repeatedly updating the three-dimensional model and creating a stream of updated three-dimensional models the rendering and capturing system may be used to capture and render three-dimensional video. As the capture arrangement employs the method of the first aspect of the invention each three-dimensional model may be obtained using in the order of 130 iterations. If a new three-dimensional model is to be created 30 times each second (corresponding to a 3D video stream of 30 frames per second), the iterative solver has approximately 0.2 ms to perform each iteration assuming convergence after 130 iterations wherein each iteration is well suited for parallelization and therefore possible to perform using modern GPUs, CPUs or TPUs. In comparison, as a NeRF requires approximately 100000 iterations to capture a scene only approximately 0.3 us will be available for each iteration wherein each iteration is ill suited for parallelization which is difficult and/or impossible to perform using modern CPUs, GPUs or TPUs.

In some implementations, the head position determining means comprises at least one camera capturing a respective image of the head of the user.

For instance, the at least one camera may be two cameras or two or more cameras. Any suitable technique for establishing the head position of a user in a three-dimensional space is applicable. For instance, some techniques identify the eyes of the user in the three-dimensional space and using an assumed eye separation distance a fixed reference distance is obtained in the three-dimensional space which may be used to extract the position of the user's head with respect to the three-dimensional space and/or the at least one camera and/or the display.

Additionally or alternatively, the head position determining means comprises a head position predictor, configured to predict the head position of the user at a future point in time given the head position of the user at a current and at least one previous point in time as determined by the head position determining means. Wherein the target view direction is based on the predicted head position of the user relative the display.

In some cases there will be a noticeable delay in the rendered three-dimensional space as the head of the user in general will have moved from the head position used to determine the target view direction when the model is rendered and displayed from the target view direction. To circumvent this, a predictor may be used to determine a future head position of the user (e.g. the head position of the user in approximately 30 ms when the next frame of the 3D video is to be displaced) wherein the target view direction is based on the predicted future head position as opposed to the current head position of the user.

According to a third aspect of the invention there is provided a computer program comprising instructions which, when the program is executed by a computer, cause the computer to carry out the method according to the first aspect of the invention.

The invention according to the second and third aspect features the same or equivalent benefits as the invention according to the first aspect. Any functions described in relation to a method may have corresponding features in a system or arrangement, and vice versa.

BRIEF DESCRIPTION OF THE DRAWINGS

The present invention will be described in more detail with reference to the appended drawings, showing currently preferred embodiments of the invention.

FIG. 7a depicts a display which displays the three-dimensional model from a target view direction according to embodiments of the present invention.

FIG. 7b depicts a three-dimensional model with a reference rendering direction according to embodiments of the present invention.

FIG. 7c depicts a user positioned in front of the display viewing the display from a direction substantially normal to the display.

DETAILED DESCRIPTION OF CURRENTLY PREFERRED EMBODIMENTS

Figure 1:
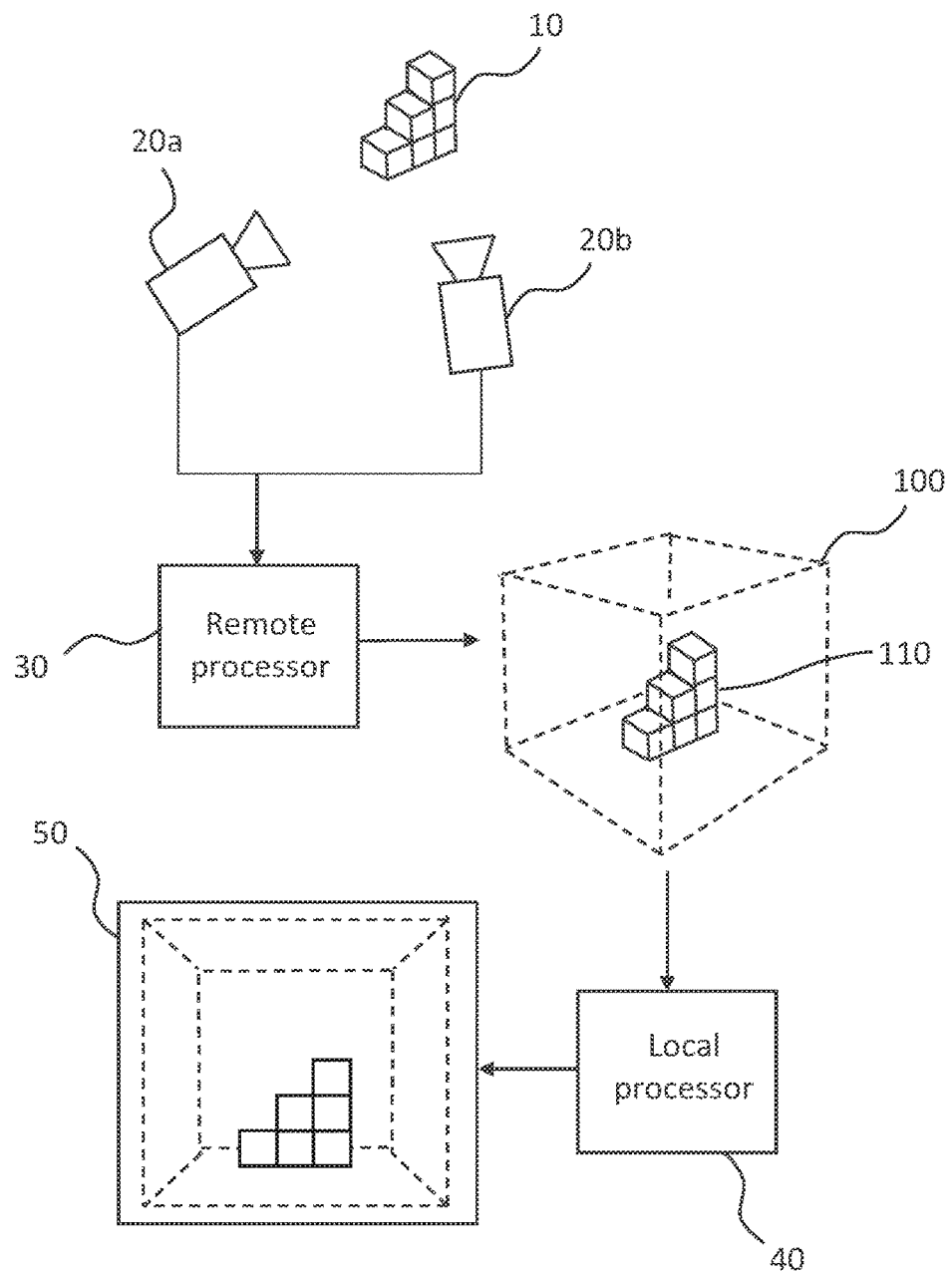
FIG. 1 is a block diagram of a capturing and rendering system according to embodiments of the present invention.

FIG. 1 illustrates how the method of the present invention may be implemented to create a three-dimensional model 100 of a scene comprising an object(s) 10, wherein the scene is captured by images from each of a plurality of cameras 20a, 20b. For instance, the scene may comprise one or more objects 10 such as one or more persons which are stationary or moving in front of the cameras 20a, 20b. The remote processor 30 is configured to perform the method of creating a 3D model 100 of the scene which comprises a 3D model 110 of the object(s) 10 present in the scene and that are visible in the images captured by the cameras 20a, 20b. Accordingly, the 3D model 100 may be provided to a local processor 40 configured to render a 2D image depicting the 3D model 100 from an arbitrary point of view. The local processor 40 performs any suitable form of rendering to obtain such an image, for instance the local processor 40 performs volumetric ray casting (or similar) to obtain such an image. The arbitrary point of view may be equal to or different from the point of view of the cameras 20a, 20b providing the local processor 40 with a freedom of choice to render a wide range of 2D images depicting the 3D model 100 from different points of view. The 2D image rendered by the local processor 40 may be provided to a display 50 which displays the 2D image.

For instance, the cameras 20a, 20b and the remote processor 30 may be provided on a remote site and used to create a 3D model 100 of the scene which is transmitted to the local processor 40 and display 50 provided in a local site. By periodically capturing new images of the scene object(s) 10 with the cameras 20a, 20b and updating the 3D model 100 accordingly a 3D video stream is obtained which e.g. may be used for teleconferencing purposes. Due to the rapid convergence of the proposed method for creating a 3D model 100 the remote processor 30 may create a new updated 3D model 100 more than 20 times per second, more than 30 times per second or more than 60 times per second allowing the 3D video stream to be as fluid as a conventional 2D video stream. The 3D video stream may be accompanied by a synchronized audio stream e.g. recorded using a microphone on the remote site and transmitted alongside the 3D video. The 3D video stream may also be a two-way stream enabling 3D teleconferencing with 3D video being simultaneously recorded and rendered on a plurality of teleconferencing clients, each client comprising a rendering and capturing arrangement such as a remote processor 30 and local processor 40.

In some implementations, the view direction from which the local processor 40 renders the 3D model may be based on the position of a user (or a user's head) in the local site relative the display 50. For instance, a convincing window effect may be established for the user viewing the display 50 wherein the display mimics a window to the 3D scene 100 rather than a mere 2D-projection of the scene. This effect is described in more detail in relation to FIGS. 7a and 7d in the below and enables e.g. more intuitive interaction between participants of a 3D-video teleconferencing session.

Figure 2:
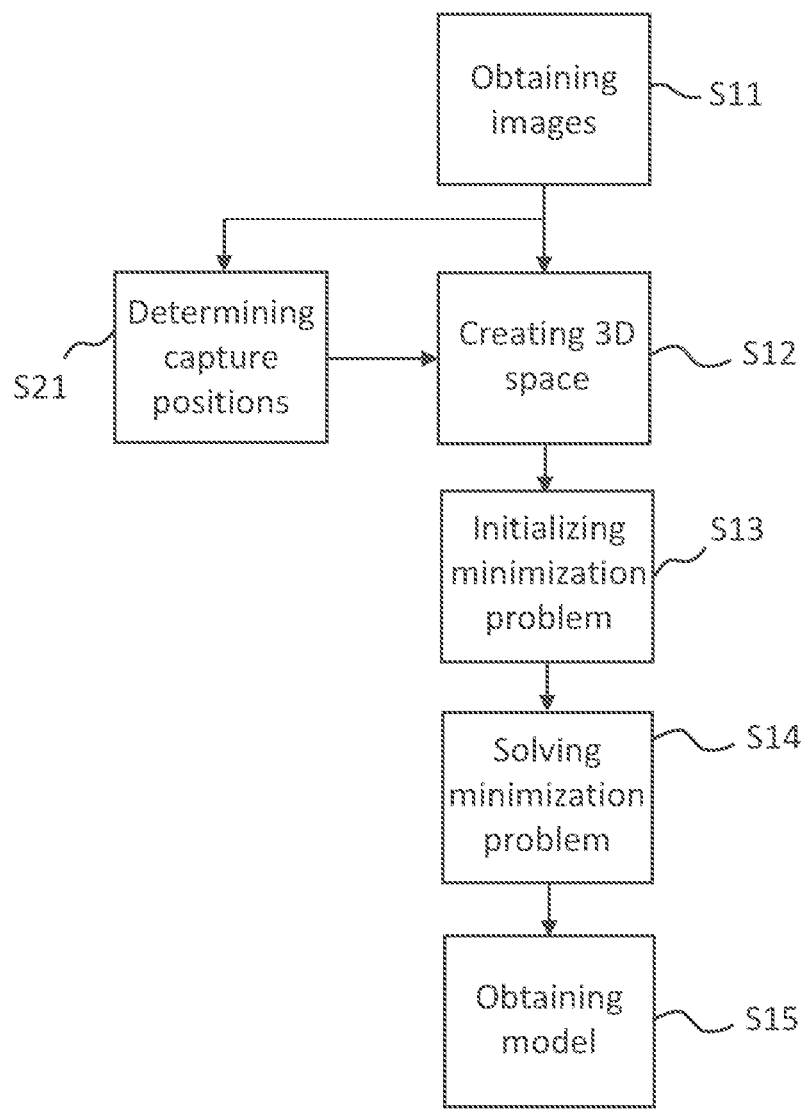
FIG. 2 is a flowchart illustrating a method for creating a three-dimensional model of a scene from a plurality of images depicting the scene.

With reference to FIG. 2 together with FIG. 3a, 3b, 3c, 3d, 3e the method of creating a 3D model 100 from a plurality of images 200a, 200b will now be described in more detail.

Figure 3A:
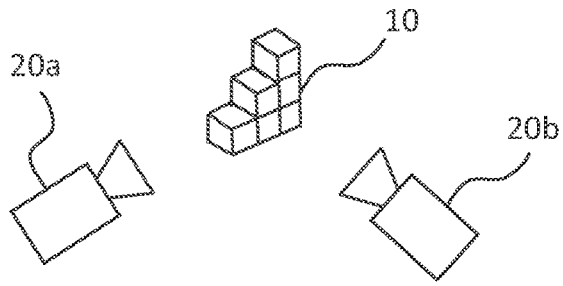
FIG. 3a illustrates a plurality of cameras viewing a scene comprising an object.

At step S21 a plurality of images 200a, 200b are obtained. The images may be captured by a respective one of a plurality of cameras 20a, 20b as illustrated in FIG. 3a. Alternatively, the images 200a, 200b may be captured using a same camera which has captured a plurality of images 200a, 200b from different positions within the scene wherein the object(s) 10 of the scene is essentially stationary between capturing of the images. Accordingly, each image 200a, 200b depicts any object(s) 10 in the scene from different points of view.

Figure 3B:
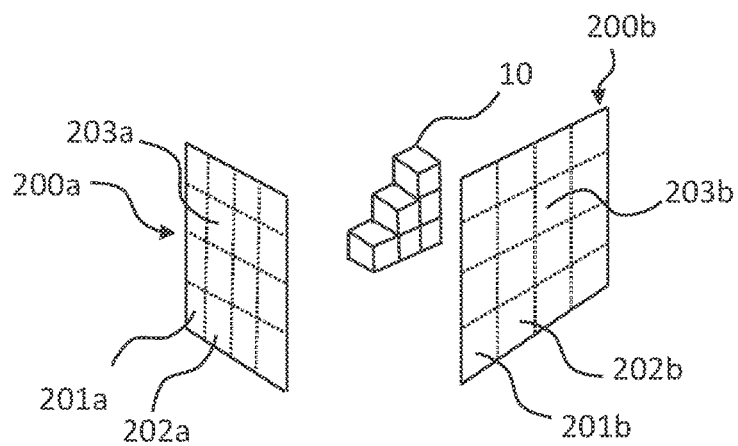
FIG. 3b illustrates a plurality of images according to embodiments of the invention, wherein each image comprises a plurality of image elements.

As illustrated in FIG. 3b each image 200a, 200b comprises a plurality of 2D image elements 201a, 202a, 203a, 201b, 202b 203b arranged in a grid. For instance, the 2D image elements 201a, 202a, 203a, 201b, 202b 203b may be respective pixels of the images 200a, 200b. Alternatively, each 2D image element 201a, 202a, 203a, 201b, 202b 203b may represent a collection of pixels such that each 2D element 201a, 202a, 203a, 201b, 202b 203b e.g. is an aggregate of two or more pixels, such as four pixels or nine pixels. That is, the 2D image elements 201a, 202a, 203a, 201b, 202b 203b may form a downsampled representation of each image 200a, 200b.

Optionally, the method may go to step S21 comprising determining the relative capture position of the images 200a, 200b. The person skilled in the art will recognize many alternative methods for determining the relative capture position of a plurality of images depicting a same scene from different points of view. This may involve first determining the so-called intrinsic camera parameters, which correspond one or more of the focal length, optical center, and radial distortion coefficients of the lens, and then the extrinsic parameters. The relative camera positions and orientations may then be found by using for instance Structure from Motion (SfM) or a known calibration pattern, such as a checkerboard, or AI solutions. Alternatively, the relative positioning of the cameras 20a, 20b may be known whereby the relative capture position of the images 200a, 200b is also known. For instance, the cameras 20a, 20b may be fixed in a housing or onto a scaffolding forming a camera system with fixed relative positions.

Furthermore, each image element 201a, 202a, 203a, 201b, 202b 203b is associated with at least one color value. For instance, each image element 201a, 202a, 203a, 201b, 202b 203b may be associated with three color values forming a color value vector C, wherein the three color values may be RGB color values indicating the relative color intensity of the red, green and blue color of the volume element. The color vector C of each 2D image element 201a, 202a, 203a, 201b, 202b 203b may represent other color models than the RGB color model, for instance with an arbitrary color model with three or more color values or with a CMY color model.

Figure 3C:
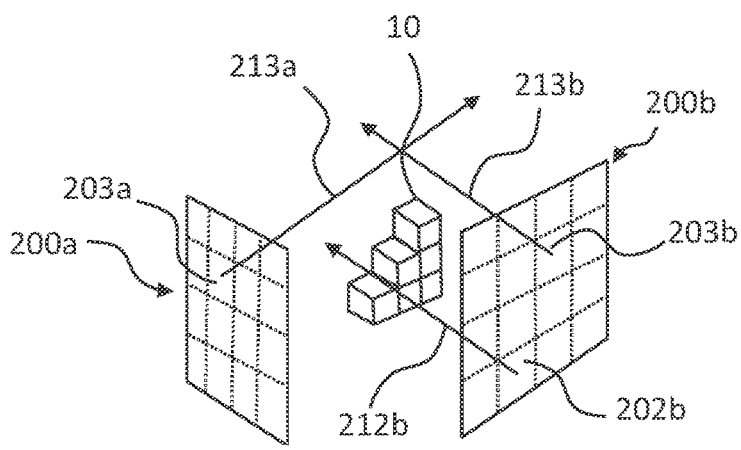
FIG. 3c illustrates ray paths associated with image elements wherein the ray paths travel through the scene comprising the at least one object.

As seen in FIG. 3c each two-dimensional image element 202b, 203a, 203b is further associated with a respective ray path 212b, 213a, 213b through the scene containing an object(s) 10. The ray paths 212b, 213a, 213b may be obtained or determined for each image element. For instance, the images 200a, 200b may be captured using light field cameras (plenoptic cameras) which in addition to capturing color and/or light intensity captures the direction from which the light is incident on the camera sensor wherein the ray paths 212b, 213a, 213b may be parallel with the incidence light direction of each image element. Alternatively, the ray paths 212b, 213a, 213b are determined or approximated for the 2D images. In a simple case, the ray paths 212b, 213a, 213b are normal to the image element and parallel with each other (or converging/diverging) and the direction the camera used to capture the image. By considering or assuming e.g. a focal length used to capture the image it is possible to instead determine ray paths 212b, 213a, 213b that are diverging or converging from each other.

The ray paths 212b, 213a, 213b in FIG. 3c are depicted as being approximately parallel although this is merely an example and the ray paths 212b, 213a, 213b of each image may be diverging or converging. Moreover, the direction of one ray path 212b may be independent of the direction of another ray path 213b of the same image 200b.

Moreover, the point in each image element from which each ray path 212b, 213a, 213b originates may be chosen stochastically each time a ray path 212b, 213a, 213b is referenced to mitigate constant sampling artifacts in the created model. For instance, the originating point of ray path 212b, 213a, 213b may be determined using two random variables indicating the originating point along two respective vectors that span the image element. Additionally, as creating random variables may be computationally expensive to perform each time the ray path 212b, 213a, 213b is referenced the two random variables may have been created and stored prior to solving the minimization problem, wherein the two random variables may simply be obtained/accessed as opposed to generate each time the ray path 212b, 213a, 213b is referenced.

Figure 3D:
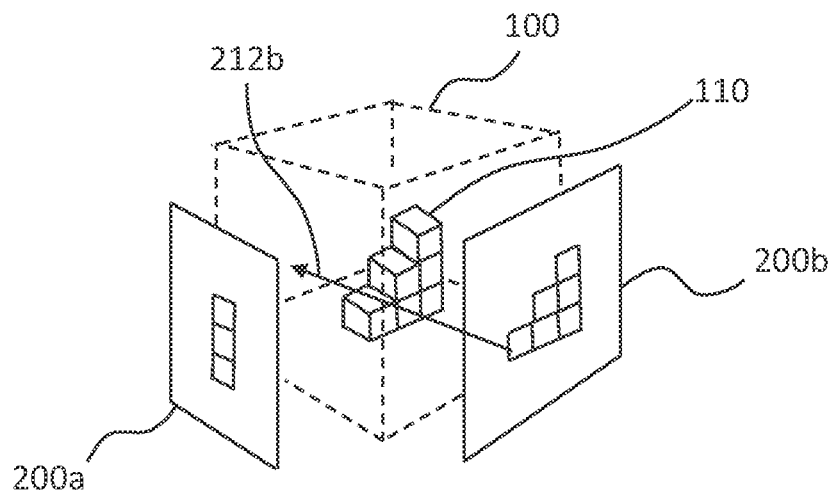
FIG. 3d illustrates a three-dimensional space comprising a three-dimensional volume which in turn comprises a model of the object of the scene.
Figure 3E:
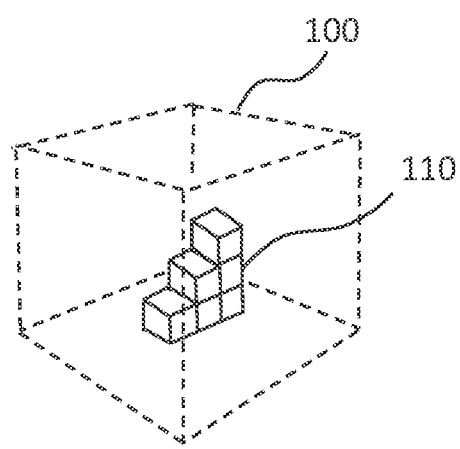
FIG. 3e illustrates a created three-dimensional model of the scene.

Turning to FIG. 3d it is illustrated how a three-dimensional volume 100 is defined at step S12. When the minimization problem is solved the three dimensional volume 100 depicting the scene of the images 200a, 200b will become the three-dimensional model 100. Thus, the three-dimensional volume and the three-dimensional model may represent the same volume elements with different opacity and color values. The three-dimensional volume 100 comprises a plurality of three-dimensional volume elements such as voxels. Although depicted as a cube the three-dimensional volume 100 may be delimited with any shape. The shape may be a predetermined shape or the shape may be determined using the captured images 200a, 200b. For instance, the shape of the three-dimensional volume 100 may be the volume which is delimited by the outermost ray paths of each image 200a, 200b. Similarly, the three-dimensional volume elements which form the three-dimensional volume 100 may be delimited with any suitable shape which describes a finite volume. For instance, the three-dimensional volume elements may be cubes, cuboids, parallelepipeds, prisms or hexagonal prisms.

At step S13 the minimization problem is initialized which may comprise initializing each volume element of the three-dimensional volume 100 with an opacity value and three color values. The initial values of each volume element may be any value, e.g. a same or random set of color values is assigned to each volume element and a same or random opacity value is assigned to each volume element.

It is understood that the three-dimensional space may comprise the three-dimensional volume and optionally one or more environment maps. When the minimization problem is solved the three-dimensional volume is the three-dimensional model of the scene and the three-dimensional model may optionally further comprise at least one environment map obtained by solving the minimization problem. Accordingly, a model three-dimensional space may be the three-dimensional space but with opacity and color values obtained by solving the minimization problem.

The method then goes to step S14 involving solving the minimization problem so as to create a 3D model of the scene wherein the 3D model of the scene comprises a 3D model 110 of an object(s) present in the scene. The minimization problem comprises a plurality of residuals, one for each image element of each image and each of the three color values. For instance, for an image with d×d image elements a total of $3d^2$ residuals may be defined. For each of the three color values the residual of one image element is defined as the difference between the color value of the image element and the accumulated direction-independent color value, obtained by accumulating the direction-independent color value and opacity value of each volume element in the three-dimensional volume 100 along the ray path of the image element. The accumulated color value for each image element of each image 200a, 200b may be obtained using the classical rendering equation $$H(r)=\int_{t_n}^{t_f}T(t)\sigma(r(t))c(r(t))dt \qquad \text{Eq. 1}$$

where $$T(t)=e(-\int_{t_n}^{t}\sigma(r(s))ds). \qquad \text{Eq. 2}$$

In equations 1 and 2 r is a vector representing each ray path and t indicates the position along the ray which ranges from a near position $t_n$ to a far position $t_f$ indicating the point along the ray path closest to the image element and the point furthest from the image respectively. Further, a indicates the opacity value of a volume element and depends on the path ray and the position t along the path ray. Accordingly, σ(r(t)) is a matrix representing the opacity value of each ray at position t along the rays wherein σ for each volume element may be represented with a scalar value indicating the degree of opacity. For instance, σ may be a value between 0 and 1 wherein 0 indicates a fully transparent volume element and 1 indicates a fully opaque volume element.

The vector c indicates the three color values of each volume element (contrary to C which indicates the color vector of each image element) which varies for each ray path and position t along each ray path making c a function of r(t).

Equations 1 and 2 may be discretized using the quadrature rule to form discretized versions of H(r) and T(t) wherein the discretized versions are labelled $\hat{H}(r)$ and $\hat{T}(t)$. The discretized versions can be expressed as:

$$\hat{H} = \Sigma_{t_n} {}^{tf}\hat{T}(t)(1 - e^{(-\sigma(t)\delta(t))})c(t) \qquad \text{Eq. 3}$$

where $$\hat{T}(t) = e^{(-\Sigma_{tn}{}^{t}\sigma(r(t))\delta(t))}. \qquad \text{Eq. 4}$$

In equation 3 and $\delta(t)$ represents a function for obtaining a discretized portion around each position t along each ray path (such as a delta function).

Accordingly, by using an iterative solver to change the opacity value a and each of the three color values represented with the color vector c of the three-dimensional volume elements until the residuals are decreased below a predetermined threshold value a three dimensional model of the scene may be created in the form of a three dimensional volume 100 representing the scene.

Thus, a three-dimensional model 100 comprising a three-dimensional representation 110 of an object in the scene may be obtained at step S15. The obtained three-dimensional object may e.g. be stored or transmitted to a second device, such as a local processor configured to render the scene from a target view direction using the three dimensional model 100.

Figure 4:
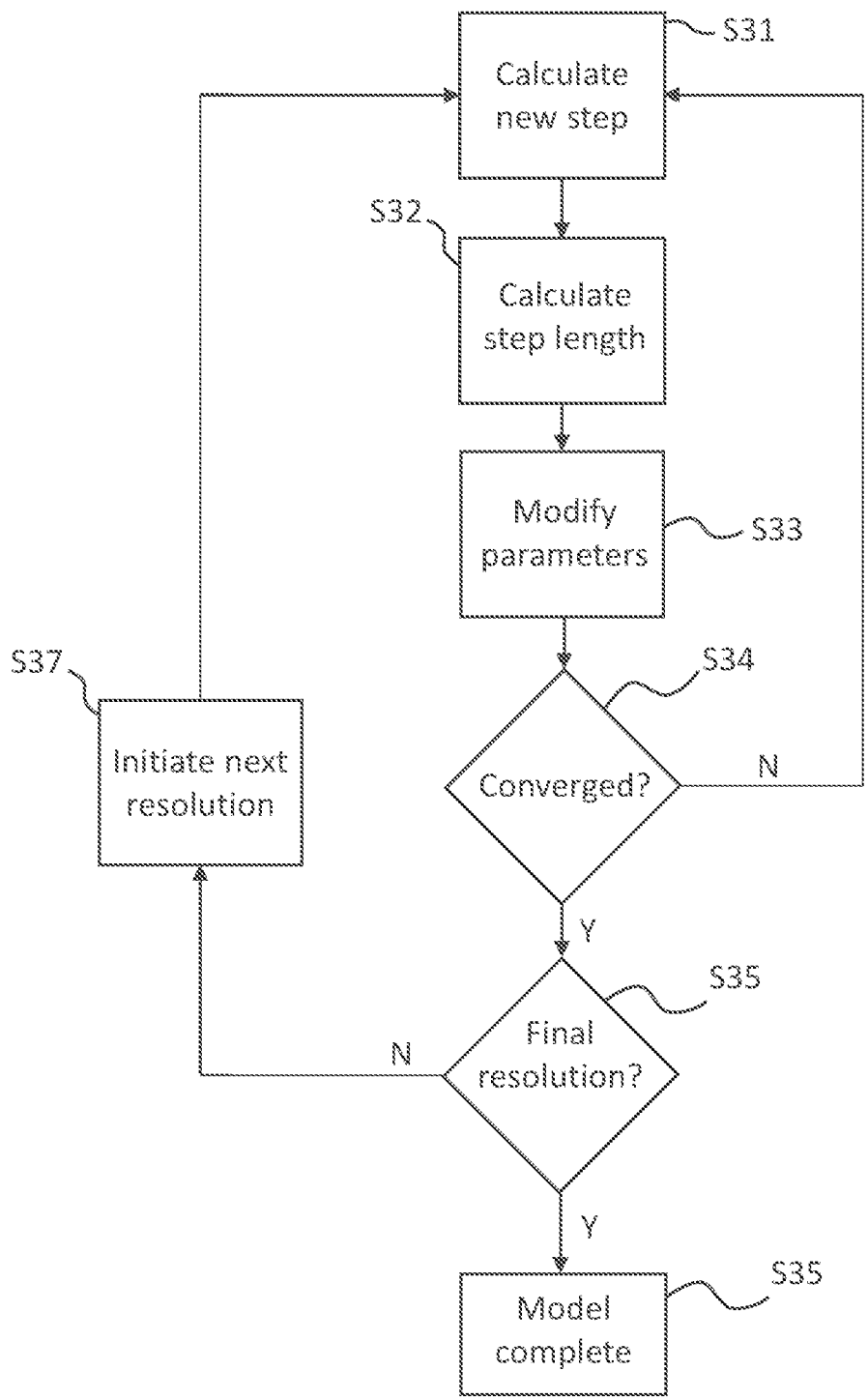
FIG. 4 is a flowchart illustrating a method for solving the minimization problem according to embodiments of the present invention.

With reference to FIG. 4 the step of solving the minimization problem will now be described in more detail. The inventors have realized that the rendering equations in equation 1 and 2 or the discretized counterpart in equation 3 and 4 may be used to formulate a minimization which converges rapidly to a three-dimensional model representing the scene due to at least in part a utilization of the color information from each image element of each image.

In some implementations, the minimization problem is formulated as a non-linear least squares problem which in general involves minimization of the entity S(x) by modification of the parameters x wherein $$S(x) = \alpha \Sigma_{i=1}^{m} r_i(x)^2 \qquad \text{Eq. 5}$$

for residuals $r_i$ where i=1, 2, ..., m and wherein $\alpha$ is a constant (e.g. $\alpha$=0.5). By applying the general non-linear least squares problem formulation from equation 5 to the discretized rendering equations from equations 3 and 4 a least squares problem for the three-dimensional space is a acquired as $$F(c(t), \sigma(t)) = \alpha \Sigma_{t_n}{}^{tf} \Sigma_{i=1}^{m} (\hat{H}_i(c_i(t), \sigma(t)) - C_i) \qquad \text{Eq. 6}$$

where the residuals are given by the difference between the accumulated color value $\hat{H}_i$ and the color value $C_i$ of each image element of each image and the parameters are the color values of each volume element and the opacity value of each volume element. For instance, three color values are used to represent each volume element and image element meaning that m=3 and that the minimization problem comprises three residual types, one for each color value. It is further noted that the three color residuals are added independently to the sum F (c(t), $\sigma$(t)) which enables efficient parallelization by enabling optimization of each residual type in parallel.

At step S34 of FIG. 4 equation 6 in the above is evaluated to determine whether the present set of parameters ($\sigma$ and c) for the three-dimensional volume (and optionally environment map) results in a sum of residuals below a predetermined (and potentially resolution specific) convergence threshold. In general, the initial parameters $x_0$, i.e. the initial set of $\sigma$ and c will not specify a three-dimensional volume associated with a sum of residuals which is below the predetermined convergence threshold and the method will then go step S31 comprising calculating a modification (step) to be applied to the parameters x to form a new set of parameters associated with a smaller sum of residuals.

The minimization problem may be solved with any suitable iterative solver, for instance the minimization problem may be solved iteratively using the Gauss-Newton algorithm. For some starting value $x_0$ of the parameters (i.e. a set of $\sigma$ and c for each volume element) a next set of the parameters may be determined iteratively as $$x_{i+1} = x_i - \gamma (J_r^T J_r)^{-1} J_r^T r(x^i) \qquad \text{Eq. 7}$$

wherein $J_r$ is the Jacobian of the residuals, matrix transposition is indicated by T, $r(x_i)$ are the residuals associated with the parameters $x_i$ and $\gamma$ indicates a step length. The step length may be equal to one but may be adjusted (as will be described in the below) to be smaller than one (in general $\gamma$ is between 0 and 1). Step S31 relates to calculating a next set of parameters by calculating the modification step with which the current parameters $x_i$ are to be modified. With the Gauss-Newton algorithm the modification step is $(J_r^T J_r)^{-1} J_r^T r(x_i)$ multiplied with $\gamma$ which is to be subtracted from $x_i$ to form the next set of parameters $x_{i+1}$. The Jacobian $J_r$ has the structure $$J_r = \begin{bmatrix} \frac{\partial r_1}{\partial x_1} & \cdots & \frac{\partial r_1}{\partial x_n} \\ \vdots & & \vdots \\ \frac{\partial r_m}{\partial x_1} & \cdots & \frac{\partial r_m}{\partial x_n} \end{bmatrix} \qquad \text{Eq. 8}$$

which means that each row of $J_r$ corresponds to the gradient of the residual $\nabla r_i$, that is $$J_r = \begin{bmatrix} \nabla r_1 \\ \vdots \\ \nabla r_m \end{bmatrix}. \qquad \text{Eq. 9}$$

Accordingly, for each ray path that is defined by each image element of each image the partial derivatives of each residual $r_i$ should be computed with respect to each parameter of each volume element. That is, for a discretized three-dimensional space equation 3 may be applied for a single ray path to obtain $$\hat{H} = e^0 (1 - e^{-\sigma_1 \delta_1}) c_1 + e^{-\sigma_1 \delta_1}(1 - e^{-\sigma_2 \delta_2}) c_2 + e^{-(\sigma_1 \delta_1 + \sigma_2 \delta_2)}) \qquad \text{Eq. 10}$$

$$(1 - e^{-\sigma_3 \delta_3}) c_3 + \ldots + e^{-(\Sigma_1^{N-1} \sigma_i \delta_i)}(1 - e^{-\sigma_N \delta_N}) c_N$$

where $c_1, c_2, c_3, \ldots, c_N$ indicates the color values of each of the N volume elements through which the ray path propagates. The partial derivatives may be obtained efficiently using only two auxiliary variables V and G if equation 10 is traversed backwards. For example, V and G are initialized as $V = e^{-(\Sigma_1^{N_0} \sigma_i \delta_i)}$ and G=0 and the following algorithm (Alg. 1) is performed:

```
V = e^(-(Σ₁^N σᵢδᵢ))
G = 0
   for i = N to i = 1 do
      V = V - σᵢδᵢ

∂Ĥ/∂cᵢ = e^(-V)(1 - e^(-σᵢδᵢ))

∂Ĥ/∂σᵢ = e^(-V)δᵢe^(-σᵢδᵢ)cᵢ - δᵢG

G = G + e^(-V)(1 - e^(-σᵢδᵢ))cᵢ
   end for
``` to obtain the partial derivatives $$\frac{\partial H}{\partial c_i} \text{ and } \frac{\partial H}{\partial \sigma_i}$$

for each residual with respect to each parameter $c_i$ and $\sigma_i$ of each volume element encountered along each ray path. The auxiliary variables V and G may be stored using only 16 bytes, e.g. with 4 bytes allocated for V and 4 bytes for each color value of G.

To perform an iterative step with the Gauss-Newton solver according to equation 7 a computationally expensive matrix inversion of the square matrix $J_r^T J_r$ is required. To avoid performing this computationally expensive matrix inversion explicitly the expression $-(J_r^T J_r)^{-1} J_r^T r(x^i)$ may be rewritten as $\Delta = -(J_r^T J_r)^{-1} J_r^T r(x_i)$ which in turn may be rewritten as $$J_r^T J_r \Delta = -J_r^T r(x_i) \quad \text{Eq. 11}$$

which specifies a linear system of equations of the form $$Ax = b \quad \text{Eq. 12}$$

wherein $A = J_r^T J_r$, $x = \Delta$ and $b = -J_r^T r(x^i)$. In general, A is a large and sparse matrix of size n×n where n is the total number of parameters of the volume elements in the tree-dimensional volume (and optionally environment map). Solving equation 12 for x may be performed using a number of solution techniques. One way of efficiently solving equation 12 in parallel is to perform an iterative preconditioned conjugate gradient algorithm. For instance, the iterative preconditioned conjugate gradient algorithm (Alg. 2) comprises the following steps:

```
r₀ = b - Ax₀
z₀ = M⁻¹r₀
p₀ = z₀
k = 0
   while true do

αₖ = (rₖᵀzₖ)/(pₖᵀApₖ)

xₖ₊₁ = xₖ + αₖpₖ
      rₖ₊₁ = rₖ + αₖApₖ
         if rₖ₊₁ᵀrₖ₊₁ < EPS then
            return xₖ₊₁
         end if
      zₖ₊₁ = M⁻¹rₖ₊₁

βₖ = (rₖ₊₁ᵀzₖ₊₁)/(rₖᵀzₖ)

pₖ₊₁ = zₖ₊₁ + βₖpₖ k = k + 1
   end while
``` wherein EPS denotes a predetermined threshold denoting the upper limit for the entity $r_{k+1}^T r_{k+1}$ when the algorithm has converged. That is, when $r_{k+1}^T r_{k+1}$ is lower than the EPS threshold the set of linear equations from equation 12 are solved with $x_{k+1}$ with sufficient accuracy. The matrix M is a preconditioner matrix, such as a diagonal Jacobi preconditioner which can be expressed as $$M = \text{diag}(J_r^T J_r) = \text{diag}\left(\sum\left(\frac{\partial r_i}{\partial x_1}\right)^2, \sum\left(\frac{\partial r_i}{\partial x_2}\right)^2, \ldots, \sum\left(\frac{\partial r_i}{\partial x_n}\right)^2\right) \quad \text{Eq. 13}$$

wherein the sum of each element is across i ranging from 1 to m wherein m is the number of residuals. The preconditioner matrix M may preferably be extracted in connection to the Jacobian $J_r$ as the diagonal elements of $\text{diag}(J_r^T J_r)$ is recognized as the squared sum of the columns of the Jacobian $J_r$ from equation 8. Additionally, the computation of Ap in algorithm 2 is preferably not performed explicitly as the matrix A is generally a large matrix. To this end the identity $$Ap = J_r^T J_r p = \Sigma_{i=1}^m \nabla r_i (\nabla r_i^T p) \quad \text{Eq. 14}$$

may be used which enables each residual $r_i$ to add independently to Ap and thereby enable efficient parallelization.

The method may then go to step S33 after step S31 is performed which determined $x = \Delta = -(J_r^T J_r)^{-1} J_r^T r(x_i)$ with sufficient accuracy (e.g. utilizing Alg. 2). Step S33 involves modifying the current parameters $x_i$ to obtain a next set $x_{i+1}$ in accordance with equation 7 with e.g. $\gamma = 1$. Following step S33 the sum of the residuals may again be evaluated at step S34 but this time for the new parameters $x_{i+1}$ whereby the iterative process involving step S31, optionally S32, S33 and S34 is repeated until the sum of the residuals is below the predetermined convergence threshold.

Optionally, when the computation of the Gauss-Newton step $\Delta = -(J_r^T J_r)^{-1} J_r^T r(x_i)$ is complete in step S31 the method may go to step S32 involving running a backtracking algorithm to find a suitable step length $\gamma$ which is used to scale the Gauss-Newton step. For instance, starting with a step length of $\gamma = 1$ and repeatedly decimating this value with a factor of $\alpha < 1$, such as $\alpha = 0.9$, while continuing to evaluate the sum of the residuals using equation 5 until a higher value of the sum S is acquired a suitable step length $\gamma$ may be identified. For instance, the step length $\gamma$ may be determined using an algorithm (Alg. 3) comprising the steps of:

```
γ = 1
α = 0.9
μ_prev = FLT_MAX
   while true do
      μ = Error(γ)
         if μ > μ_prev then
            return γ/α
         end if
      γ = αγ
      μ_prev = μ
   end while
``` wherein FLT_MAX indicates a large value, e.g. the largest finite floating point value which can be represented in the computer environment implementing the algorithm. Moreover, μ=Error(γ) indicates the residual error by evaluating equation 5 or 6 with the parameter $x_i$ modified with $(J_r^T J_r)^{-1} J_r^T r(x_i)$ weighted with γ. For as long as μ decreases the step size is decimated further until a higher value of μ is acquired, whereby the previous value of γ is returned as the optimal step length. That is the step length associated with the smallest error.

When the optimal step length γ is determined the method scales the step calculated at S31 with the step length calculated at S32 to obtain a next modified set of parameters $x_{i+1}$ which is passed on to step 34.

As mentioned in the above S31, optionally S32, S33 and S34 are repeated until the sum of the residuals is below a predetermined convergence threshold. When a set of parameters $x_{i+1}$ associated with residuals below the predetermined convergence threshold is obtained the method may go to step S35 wherein it is determined if the three-dimensional space (i.e. the three-dimensional volume and optionally environment map) is represented with the final resolution. To facilitate faster convergence, the three-dimensional space (volume) is first initialized with a first resolution whereby the minimization problem is solved at the first resolution by finding a set of parameters associated with residuals below the predetermined first resolution convergence threshold. The first resolution solution is used to initialize a three-dimensional space (volume) of a second resolution, which is a higher resolution than the first resolution, whereby the minimization problem is solved at the second resolution by finding a set of parameters associated with residuals below the predetermined second resolution convergence threshold. In this manner, the minimization problem may be solved hierarchically at increasing resolutions. For instance, the minimization problem may utilize two, three, four, five or more resolutions and experiments have shown that using at least two resolutions helps to speed up convergence and reduce the risk of the solver converging to a local minimum as opposed to the global minimum.

Accordingly, if it is determined at S35 that the parameters associated with residuals below the predetermined convergence threshold are associated with a three-dimensional space of the final (highest) resolution the method goes to step S35 in which the final complete three-dimensional model is represented with the parameters of the three-dimensional space. If it is determined at S35 that the resolution was not the final resolution the method goes to step S37 comprising initializing a three-dimensional space with the next (higher) resolution.

The initial parameters of the next resolution three-dimensional space are based on the parameters of the previous resolution parameters. For instance, the next resolution parameters may be obtained by interpolating the previous resolution parameters. The next resolution three-dimensional space is then used at step S31 to calculate a modification step whereby iteratively repeating steps S31, optionally S32, S33 and S34 leads to convergence at the next resolution. For instance, a first resolution for the three-dimensional volume of the three-dimensional space may be $64^3$, whereby the second resolution is $128^3$, the third is $256^3$ and the fourth is $512^3$.

In some implementations, an opacity residual L is added for each ray path of each image element of each image in addition to the three color residuals to mitigate problems with smoke-like artifacts introduced by solving the minimization problem for scenes with view dependent objects. The purpose of the opacity residual L is to penalize (i.e. provide a high associated residual value) for ray paths which have an accumulated opacity value that deviates from either a value indicating a fully transparent ray path or a value indicating a fully opaque ray path. For instance, if the opacity value of each volume element is a value between 0 and 1 wherein 0 indicates a fully transparent volume element and 1 indicates a fully opaque volume element the following simple definition of L may be used:

$$L=\lambda(-4(\hat{T}-0.5)^2+1) \qquad \text{Eq. 15}$$

Wherein λ is a factor determining to which extent ray paths should be penalized for an accumulated opacity value deviating from either fully opaque or fully transparent wherein λ preferably is between 0.05 and 0.15, and most preferably around 0.1. Higher values of λ may result in unwanted artifacts of too opaque or too transparent surfaces. However, upon convergence of the minimization problem with the opacity residual and λ below 0.15 or without the L-residual entirely (e.g. with λ=0) λ may be raised to 0.5 or above, or preferably to 0.8 or above, or most preferably to around 1.0 for a one or more additional iterations to clean up any remaining smoke-like artifacts in the created three-dimensional model of the scene.

Figure 5:
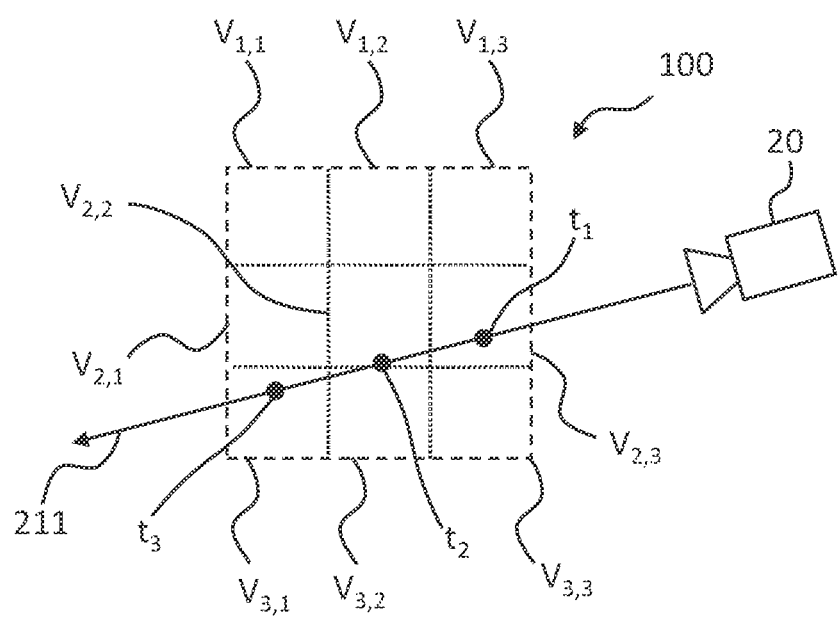
FIG. 5 depicts a ray path of an image element propagating through the discrete volume elements of the three-dimensional model.

FIG. 5 illustrates schematically how a ray path 211 of an image element of an image captured by a camera 20 propagates through the three-dimensional volume 100. The three-dimensional volume 100 comprises a plurality of three-dimensional volume elements $V_{1,1}$, $V_{1,2}$, $V_{1,3}$, $V_{2,1}$, $V_{2,2}$, $V_{2,3}$, $V_{3,1}$, $V_{3,2}$, $V_{3,3}$. In this particular example, the ray path 211 propagates through volume elements $V_{2,3}$, $V_{2,2}$, $V_{3,2}$ and $V_{3,1}$ meaning that the residuals of the image element associated with the ray path 211 will depend on the accumulated color values and opacity value of each of the volume elements $V_{2,3}$, $V_{2,2}$, $V_{3,2}$ and $V_{3,1}$. Also depicted in FIG. 5 are sample points $t_1$, $t_2$, $t_3$ indicating where along the ray path 211 the parameters of the three-dimensional volume 100 are sampled. The sample points $t_1$, $t_2$, $t_3$ may by default be equidistantly placed along the ray path 211 wherein the distance between each neighboring pair of sample points may be referred to as a raymarch step. In some implementations, jittering is applied to the sample points $t_1$, $t_2$, $t_3$ to enable a random placement of each sample point $t_1$, $t_2$, $t_3$ within half of a raymarch step from the respective equidistant default position. As for the random originating point of each ray path 211 in each image element, jittering of the sample points $t_1$, $t_2$, $t_3$ along each ray path 211 mitigates issues with constant sampling in the three-dimensional volume 100. The jittering may be enabled by one random variable indicating the displacement of the sample point from the equidistant default position and a new random position may be used each time the ray path is evaluated. To avoid performing the computationally costly procedure of generating new random values for each sample point $t_1$, $t_2$, $t_3$ when solving the minimization problem the random values may have been generated beforehand (and are e.g. shared with the random variables of the image elements described in the above) and merely accessed or obtained when solving the minimization problem.

Figure 6:
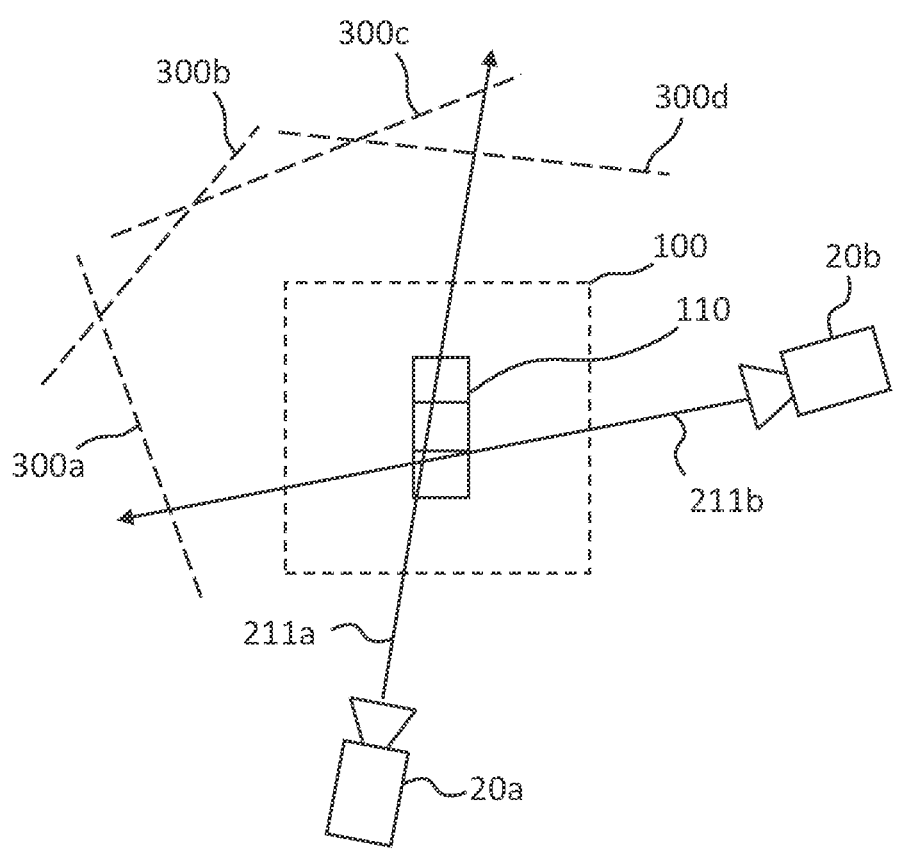
FIG. 6 depicts the three-dimensional volume together with a set of environment maps surrounding the three-dimensional volume in accordance with embodiments of the present invention.

FIG. 6 illustrates that the three-dimensional volume 100 may be surrounded by one or more two-dimensional environment maps 300a, 300b, 300c, 300d. Accordingly, the three-dimensional space may comprise the three-dimensional volume 100 and environment map(s) 300a, 300b, 300c, 300d. Each environment map 300a, 300b, 300c, 300d comprises a grid of two-dimensional environment map elements wherein each environment map element comprises three color values and an opacity value much like the volume elements of the three-dimensional volume 100. When solving the minimization problem the residual of each ray path 211a, 211b is based on the accumulated color value of each volume element of the volume 100 and each environment map element of one or more environment maps 300a, 300b, 300c, 300d which the ray path 211a, 211b passes. The environment maps 300a, 300b, 300c, 300d may be provided in a plurality of layers substantially or entirely surrounding three-dimensional volume 100. While depicted as flat layers the environment maps 300a, 300b, 300c, 300d may be defined as concave, convex, curved or spherical surfaces. Moreover, at least one environment maps may be defined as a cube map with six rectangular surfaces surrounding the three-dimensional volume 100.

Accordingly, the opacity and color value of each environment map element are included as parameters in the minimization problem and the environment maps are created alongside the three-dimensional volume 100 comprising a model 110 of one or more objects of the scene. To this end, the environment maps 300a, 300b, 300c, 300d may be initiated with a random, constant or arbitrary predetermined set of parameters similar to the initialization of the volume elements. Moreover, as the resolution of the three-dimensional volume 100 may be increased to enable solving the minimization problem in hierarchically the resolution of the environment maps 300a, 300b, 300c, 300d may also be increased in a corresponding manner.

With reference to FIGS. 7a, 7b and 7c there is depicted a rendering arrangement comprising a display 50 connected to a local processor 40 which renders an image 100a of the three-dimensional space (i.e. three-dimensional volume and optionally environment map) from a target view direction. The three-dimensional model 100 may be associated with a reference view direction R. The reference view direction R may be implicitly defined by the three-dimensional volume 100, e.g. the reference view direction R may be based on the arrangement of the volume elements comprised in the three-dimensional volume 100. The reference view direction R may specify the plane of the imaginary window which should be displayer on display 50 relative the three-dimensional volume 100 and any object(s) 110 therein.

In some implementations, the local processor 40 obtains a three-dimensional model 100, or a stream of three-dimensional models 100 of the same scene for 3D video rendering, e.g. over a network. The rendering arrangement further comprises head position determining means 60a, 60b configured to determine the position of the head of a user 70 viewing the display. The head position determining means 60a, 60b may comprise one or more cameras 60a, 60b configured to periodically acquire images of the user 70. The head position determining means 60a, 60b may comprise a processor configured to determine the head position of the user 70 relative a reference direction, e.g. by analyzing the images of the one or more cameras 60a, 60b. The reference direction may e.g. be the normal N of the display 50. Alternatively, the images of the at least one camera 60a, 60b are provided to the local processor 40 wherein the local processor 40 is configured to perform the analysis to determine the position of the user's 70 head with respect to the reference direction. The analysis may involve any suitable method for determining the position of the user's (70) head and may e.g. involve image recognition, triangulation and/or a neural network. For instance, the determination of the user's head 70 relative reference direction may utilize the fact that the distance between the eyes of human is approximately 12 cm. With such a reference distance the head position determining means may efficiently establish where the head of the user 70 is located in front of the display 50.

Figure 7D:
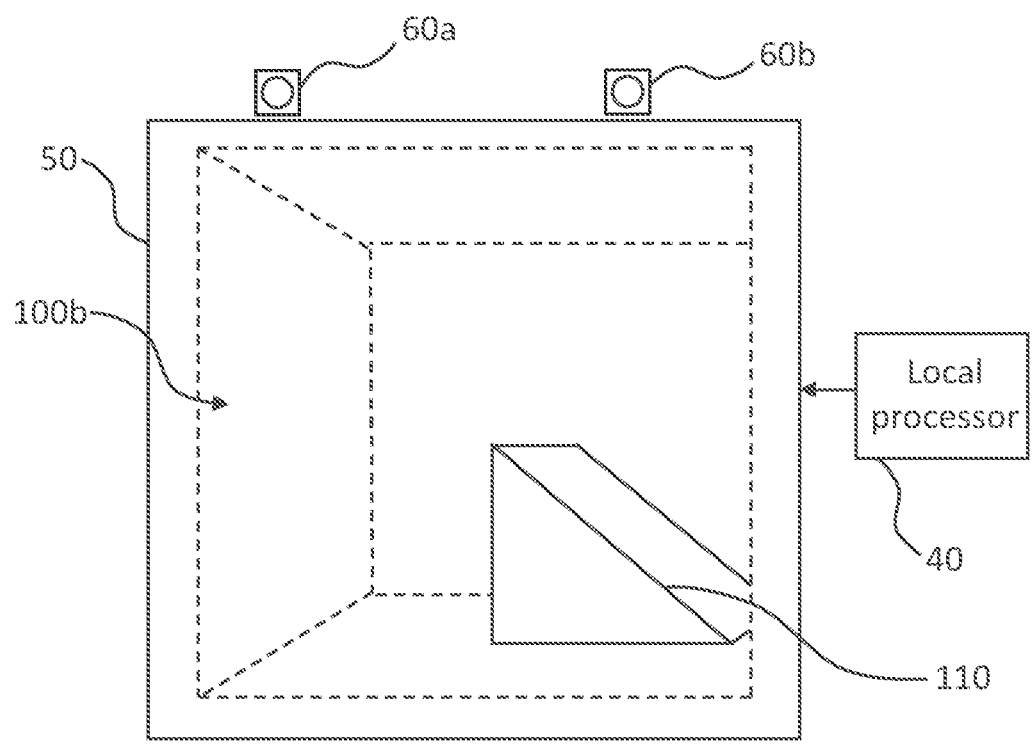
FIG. 7d depicts a display which displays the three-dimensional model from another target view direction according to embodiments of the present invention.
Figure 7E:
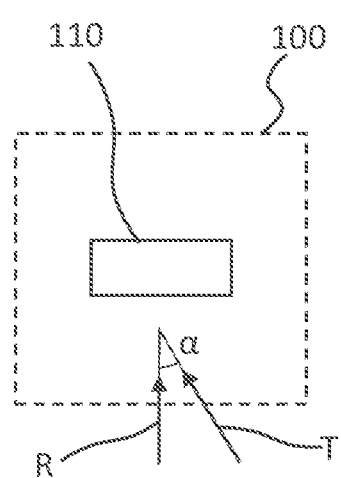
FIG. 7e depicts a three-dimensional model with a reference rendering direction and a target rendering direction which differs from the reference rendering direction.
Figure 7F:
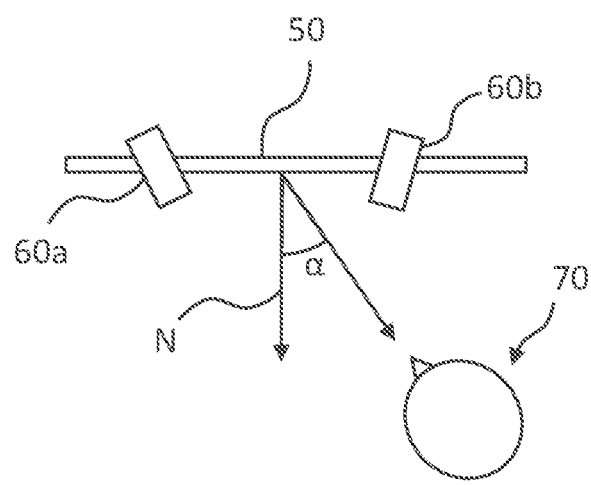
FIG. 7f depicts a user positioned in front of the display viewing the display from an off-normal viewing direction.

With reference to FIGS. 7d, 7e and 7f it is illustrated how information relating to the position of the user's 70 head relative the display 50 may be utilized to simulate a window effect with the display 50. As the user 70 moves away from a reference display view direction—such as the normal N of the display 50—and views the display 50 from an angle α relative the normal N the target rendering direction T for the local processor 40 is changed accordingly to render the three-dimensional volume 110b from a target direction T which forms approximately an angle α with the reference rendering direction R. Thus, when the user 70 moves relative the display 50 the target rendering direction T changes so as to simulate that the scene comprising object(s) 110 is stationary on the other side of the of display 50. In other words the display 50 acts as a window into the three-dimensional volume 100, wherein which portion of the three-dimensional volume 100 that is visible to the user 70 changes with respect to which direction from which the user 70 looks through the imaginary window/display.

Although the angle α is illustrated as being in the horizontal plane the angle α may comprise both a vertical and horizontal component to describe head positions that move side-to-side and up-and-down in front of the display 50.

Additionally, as the steps of determining the head position of the user 70 relative the display, rendering the three-dimensional model 100 from a suitable target viewing direction T and displaying the rendered image on the display 50 will in general take some time to perform a distracting delay between the actual head position for the user 70 and the target view direction T which is currently displayed on the display 50 may occur. This distracting delay will be more apparent the faster the user 70 moves his/her head in front of the display and alters the angle α.

To mitigate this effect, a predictor may be implemented as a part of the head position determining means 60a, 60b and/or the local processor 40 wherein the predictor obtains at least two previous head positions and calculates a future position of the head. For instance, if the steps involving rendering and displaying the three-dimensional volume 100 from a target view direction T requires a time t to perform the predictor may be configured to predict the head position of the user 70 a time t into the future by e.g. utilizing the latest and previous head positions. The predicted future head position is then provided to the local processor which starts the process of rendering the three-dimensional volume 100 with a target view direction T based on the predicted head position as opposed to the current or latest determined head position. Accordingly, the head of the user 70 will most likely be at the predicted position when the rendered image for that position is displayed on the display 50 which mitigates or removes the distracting delay.

The predictor may operate by calculating the future head position using the physics simulation of the motion of the head of the user (e.g. by monitoring and calculating the inertia and acceleration of the head). Alternatively or additionally, the predictor may comprise a neural network trained to predict the future head position given two or more previous head positions. It is noted that the head position determining means may be configured to update the head position of the user 70 with a higher frequency than the local processor renders a novel view of the three-dimensional model and/or with a higher frequency than the rate at which an updated three-dimensional model 100 is provided to the local processor 40.

Although the object 110 is depicted as a stationary geometrical shape the object 110 may be move or otherwise change in the three-dimensional volume 100 whilst the reference rendering direction R is maintained. Particularly, the object 110 may be a person moving and interacting with the user 70 via the display 50 as a part of a 3D video teleconferencing suite.

The person skilled in the art realizes that the present invention by no means is limited to the preferred embodiments described above. On the contrary, many modifications and variations are possible within the scope of the appended claims. For example, the position determination means may comprise at least one camera to enable determining the position of the user's 70 head and the at least one camera of the position determining means may be used simultaneously as one of the plurality of cameras used to capture the plurality of images of the scene. Accordingly, in two-way video conferencing system a plurality of cameras may be provided on both the remote end and the local end, wherein at least one of the cameras on either end is used as a part of the head position determining means.

What is claimed is:

1. A method for creating a three-dimensional model of a scene, the model comprising a three-dimensional space comprising a plurality of discrete three-dimensional volume elements, each three-dimensional volume element being associated with three initial direction-independent color values and an initial opacity value, said method comprising:
   obtaining a plurality of images of said scene, each image comprising a grid of image elements wherein each image element is associated with three color values and a ray path through said three-dimensional space;
   defining a minimization problem, wherein the direction-independent color values and opacity value of each volume element forms parameters of the minimization problem, and wherein the minimization problem comprises three residuals, one for each color value, wherein each residual is based on the difference between:
     a) the color value of each image element of each image, and
     b) an accumulated direction-independent color value, obtained by accumulating the direction-independent color value and opacity value of each volume element along the ray path of each image element of each image,
   creating the three-dimensional model of the scene by solving said minimization problem with a Gauss-Newton solver iteratively adjusting said parameters based on a Jacobian of the residuals being a function of the parameters, so as to reduce each residual below a predetermined threshold.

2. The method according to claim 1, wherein said minimization problem is a non-linear least squares problem.

3. The method according to claim 1, wherein solving said minimization problem comprises calculating each residual in parallel and solving said minimization with an iterative parallel solver.

4. The method according to claim 1, wherein solving said minimization problem by adjusting said parameters comprises:
   solving said minimization problem for a first resolution of the three-dimensional space and for a second resolution of the three-dimensional space, wherein said second resolution is higher compared to said first resolution.

5. The method according to claim 4, wherein said minimization problem is solved at the first resolution to obtain a first resolution model of the scene prior to solving the minimization problem at the second resolution, said method further comprising:
   initializing each volume element of the three-dimensional space at the second resolution with three initial direction-independent color values and an initial opacity value based on the three direction-independent color values and an opacity value of each volume element of the first resolution model of the scene.

6. The method according to claim 1, further comprising:
   selecting at least two images of said plurality of images, wherein each of said at least two images comprise an image element with a ray path passing through a same volume element of said created model; and
   determining for each color value of said same volume element in the created model a spherical function indicative of the direction-dependent color intensity of said volume element based on the corresponding color value of the image element with a ray path passing through the same volume element of said obtained model.

7. The method according to claim 1, further comprising:
   defining an auxiliary element for each image element of each image, wherein said auxiliary element is associated with a weighting value and the three color values of the associated image element;
   wherein each residual for each color is based on the difference between:
     a) the color value of each image element of each image, and
     b) a modified accumulated direction-independent color value, wherein the modified accumulated direction-independent color value is based on a weighted sum of the accumulated direction-independent color value and the color value of the auxiliary element, wherein the weights of the weighted sum are based on the weighting value and wherein the weighting value of each auxiliary element is a parameter of the minimization problem, and
   wherein the minimization problem further comprises penalty residual for each auxiliary element, the penalty residual being based on the weighting value such that auxiliary elements with weighting values that introduce more of the auxiliary elements color values are penalized more.

8. The method according to claim 1, wherein said opacity value ranges from a first value, indicating a fully transparent volume element, and a second value, indicating a fully opaque volume element,
   wherein said minimization problem comprises an opacity residual for each image element based on the accumulated opacity along the ray path of each image element, and wherein the opacity residual is proportional to the smallest one of:
   the difference between the accumulated opacity and the first value and
   the difference between the accumulated opacity and the second value.

9. The method according to claim 1, further comprising:
   defining a two-dimensional environment map at least partially surrounding the three-dimensional volume elements, said environment map comprising a plurality of two-dimensional environment map elements wherein each environment map element comprises three color values and an opacity value,
   initializing each two-dimensional environment map element with three initial direction-independent color values and an initial opacity value;

wherein the parameters of the least squares problem further comprises the direction-independent color values and opacity value of the environment map.

10. A capture arrangement for capturing a three-dimensional model of a scene, the model comprising a three-dimensional space which comprises a plurality of discrete three-dimensional volume elements, each three-dimensional volume element being associated with three initial direction-independent color values and an initial opacity value, said system comprising:
   a plurality of cameras configured to capture a plurality of images of said scene, each image comprising a grid of image elements wherein each image element is associated with three color values and a ray path through said three-dimensional space, and
   a processing device configured to create the three-dimensional model of the scene by solving a minimization problem with three residuals, one for each color value, using an iterative Gauss-newton solver for adjusting a set of parameters of the minimization problem based in a Jacobian of the residuals being a function of the parameters so as to reduce each residual below a predetermined threshold,
   wherein the parameters of the minimization problem comprise the direction-independent color values and opacity value of each volume element and wherein each residual is based on the difference between:
      a) the color value of each image element of each image, and
      b) an accumulated direction-independent color value, obtained by accumulating the direction-independent color value and opacity value of each volume element along the ray path of each image element of each image.

11. A capturing and rendering system comprising the capturing arrangement according to claim 10 and a rendering arrangement, the rendering arrangement comprising:
   a display, configured to display an image,
   head position determining means, configured to determine the head position of a user relative a normal of the display, and
   a rendering unit configured to obtain the three-dimensional model captured by the capturing arrangement, a reference direction indicating a reference view direction of the model, and the head position of the user determined by the head position determining means,
   wherein the rendering unit is further configured to render an image of the three-dimensional model from a target view direction and provide said image to said display, wherein the displacement of said target view direction from said reference view direction is equal to the displacement of the head position of the user relative the normal of the display.

12. The capturing and rendering system according to claim 11, wherein said system updates said three-dimensional model and said target view direction periodically to capture and render three-dimensional video as a part of a videoconferencing system.

13. The capturing and rendering system according to claim 11, wherein said head position determining means comprises at least one camera capturing a respective image of the head of the user.

14. The capturing and rendering system according to claim 11, wherein said head position determining means comprises:
   a head position predictor, configured to predict the head position of the user at a future point in time given the head position of the user at a current and at least one previous point in time as determined by the head position determining means,
   wherein said target view direction is based on the predicted head position of the user relative the display.

* * * * *